(12) United States Patent
Hsu et al.

(10) Patent No.: US 10,804,789 B2
(45) Date of Patent: Oct. 13, 2020

(54) COAXIAL ELECTROMAGNETIC APPARATUS

(71) Applicants: YUZEN SUSTAINABLE ENERGY CO., LTD., Taichung (TW); YUZEN (HK) SUSTAINABLE ENERGY CO., LTD., Hong Kong (CN); YUZEN SUSTAINABLE ENERGY PTE LTD., Singapore (SG)

(72) Inventors: Yung-Shun Hsu, Taichung (TW); Ming-Chun Hsu, Taichung (TW); Wen-Yu Hsu, Taichung (TW)

(73) Assignees: YUZEN SUSTAINABLE ENERGY CO., LTD., Taichung (TW); YUZEN (HK) SUSTAINABLE ENERGY CO., LTD., Hong Kong (CN); YUZEN SUSTAINABLE ENERGY PTE LTD., Singapore (SG)

( * ) Notice: Subject to any disclaimer, the term of this patent is extended or adjusted under 35 U.S.C. 154(b) by 70 days.

(21) Appl. No.: 16/325,723

(22) PCT Filed: Aug. 16, 2016

(86) PCT No.: PCT/CN2016/000457
§ 371 (c)(1),
(2) Date: Feb. 15, 2019

(87) PCT Pub. No.: WO2018/032122
PCT Pub. Date: Feb. 22, 2018

(65) Prior Publication Data
US 2019/0207504 A1    Jul. 4, 2019

(51) Int. Cl.
*H02K 53/00*    (2006.01)
*H02K 35/06*    (2006.01)

(52) U.S. Cl.
CPC ............. *H02K 53/00* (2013.01); *H02K 35/06* (2013.01)

(58) Field of Classification Search
CPC .............................. H02K 53/00; H02K 35/06
(Continued)

(56) References Cited

U.S. PATENT DOCUMENTS 4,371,801 A * 2/1983 Richter .................. H02K 21/24
310/156.36
4,520,300 A * 5/1985 Fradella ............... G05B 19/104
310/268

(Continued)

*Primary Examiner* — John K Kim
(74) *Attorney, Agent, or Firm* — Leong C. Lei

(57) ABSTRACT

A coaxial electromagnetic apparatus formed of at least one magnetic disk and at least one coil disk synchronously and relatively movable and staggered at intervals. The magnetic disk and the coil disk are respectively provided with at least one power-driven module and at least one power generation module. The power-driven modules are provided at the outermost diameters of the magnetic disk and the coil disk. The power generation modules are provided at the innermost diameters of the magnetic disk and the coil disk. A rotation speed of the magnetic disk is increased due to torque amplification and good magnetic current management of the power-driven modules, thereby achieving low power consumption and large thrust of the power-driven modules. The power generation modules generate high cutting frequency to increase power generated and meet the requirement for supplying power to the power-driven modules, thereby achieving autonomous power generation and a self-propelled motor.

16 Claims, 6 Drawing Sheets

(58) Field of Classification Search
USPC .................................................. 310/46, 268
See application file for complete search history.

(56) References Cited

U.S. PATENT DOCUMENTS

| | | | | |
|---|---|---|---|---|
| 5,982,074 A * | 11/1999 | Smith | ...................... | H02K 3/04 |
| | | | | 310/156.36 |
| 6,930,422 B2 * | 8/2005 | Rose | ...................... | H02K 21/12 |
| | | | | 310/112 |
| 7,646,178 B1 * | 1/2010 | Fradella | ............... | H02K 1/2793 |
| | | | | 322/22 |
| 8,294,317 B2 * | 10/2012 | Kamida | ............... | A61B 5/0488 |
| | | | | 310/102 R |
| 10,186,922 B2 * | 1/2019 | Schuler | .................... | H02K 3/26 |
| 2006/0012263 A1 * | 1/2006 | Smith | ................... | H02K 16/00 |
| | | | | 310/268 |
| 2019/0207504 A1 * | 7/2019 | Hsu | ........................ | H02K 35/06 |

* cited by examiner

COAXIAL ELECTROMAGNETIC APPARATUS

(a) TECHNICAL FIELD OF THE INVENTION

The present invention relates generally to the technical field of electromagnetism, and more particularly to a coaxial electromagnetic apparatus that is capable of simultaneously producing kinetic output and power generation in order to achieve the purposes of autonomous power generation and self-propelled motor and also to increase output power through completely magnetic assistance force, torque amplification and management of magnetic flow of a power-driven module and also to increase the amount of power generation of a power generation module.

(b) DESCRIPTION OF THE PRIOR ART

A regular power-driven machine adopts electromagnetism to generate high speed rotation and is made up of a stator and a rotor that are rotatable relative to each other. Taking an annular power-driven machine as an example, the stator is provided with a plurality of coils on an inner circumference thereof, and the rotor is provided with a plurality of magnetic members that correspond to the coils on an outer circumference thereof. Energizing the coils may make the coils magnetized so as to induce an effect of magnetic force for mutual expulsion and mutual attraction with respect to the magnetic members of the rotor thereby driving the rotor to rotate at a high speed and thus drive a spindle mounted to the rotor to generate an output of kinetic energy, such as a motor.

A regular power generation machine is an electromagnetic apparatus that is made up of an induction coil set and a magnet array set, wherein the induction coil set comprises at least one coil arranged on at least one magnetic permeable member, while the magnet array set comprises two magnetic members that are respectively arranged at two ends of an axis of the induction coil set. The two magnetic members are arranged with opposite magnetic poles facing each other. The magnet array set and the induction coil set can be referred to as a rotor and a stator, respectively, so that through relative linear motion or rotary motion, the coils of the induction coil set may generate voltages through cutting of magnetic force lines so as to achieve a purpose of electrical power generation.

In view of the operation principles of the power-driven machine and the power generation machine discussed above, both are operable based on electromagnetism and a primary difference is that the electromagnetic apparatus is connected to a power source to receive electricity therefrom or is connected to a load to supply electricity thereto to serve as a power-driven machine or a power generation machine. It is appreciated that they can be designed as a common mechanism to form a power generation machine that supplies electricity for use by a power-driven machine, while kinetic energy of the power-driven machine may be applied to have the power generation machine generating electricity thereby forming an apparatus featuring autonomous power generation and self-propelling motor. Recently, a lot of researchers have been working very hard to design an electromagnetic apparatus that suits the above purposes. A commonly seen design that is currently available is to mount electromagnetic sets, which are provided for use with a power-driven machine and a power generation machine, respectively, on two ends of an axle.

However, in an operation of the power-driven machine, power supply is made in an intermittent fashion to allow extraction of necessary magnetic power for driving the rotor, and due to the arrangement of high magnetic flux and high cutting counts between the coils and magnetic members, in a period when the supply of electricity is temporarily cut off, the coils are still subjected to magnetism cutting by the magnetic members that are kept in motion by inertial and thus generate voltages therein. As such, the power-driven machine would require an input of a relatively large electrical power and this causes waste of energy and would reduce the performance of the power-driven machine for outputting kinetic energy with the same input of electrical power, so that the power generation machine is no longer capable of generating a sufficient amount of electrical power for use by the power-driven machine.

In other words, the known electromagnetic apparatus that includes both functions of power generation and power driving cannot effectively avoid power generation by the power-driven machine during the time of not supplying electrical power thereto in order to lessen the internal voltage, leading to relatively large power consumption occurring in the power-driven machine, and would not meet the needs for autonomous power generation and self-propelling motor due to a relatively large magnetic drag in operation thereof and a relatively small magnetic assistance during driving. Thus, it is desired, in the industry, to develop a solution that overcomes the above problems.

Thus, the present inventor has made throughout and study of the issues that an electromagnetic apparatus featuring both power generation and power driving must face during operation thereof and has conducted actively search for a solution based on years' experience of research and development in the related field, so as to eventually work out, through repeated study and test, a coaxial electromagnetic apparatus to overcome the troubles and inconvenience caused by the unknown electromagnetic apparatus being incapable of generating sufficient electrical power and kinetic energy.

SUMMARY OF THE INVENTION

Thus, a primary objective of the present invention is to provide a coaxial electromagnetic apparatus, which, through lowering an internal voltage when a power-driven module is not supplied with electrical power and also eliminating magnetic drag, generates completely magnetic assistance force to lower down input electrical power for driving and reduce loss of electrical power and also increase rotational speed of operation to thereby effectively increase power output.

Further, another primary objective of the present invention is to provide a coaxial electromagnetic apparatus, which, through amplification of torque and good management of magnetic flow of a power-driven module, allows a rotational speed of a magnetic disk to increase, makes the power generation module generate high cutting frequency, and thus increase amount of electricity generated to meet the need of supplying power to the power-driven module so as to achieve the purpose of autonomous power generation and self-propelled motor.

In view of the above, the present invention generally adopts the following technical solution to achieve the previous objectives and the advantages thereof:

A coaxial electromagnetic apparatus is characterized by being formed of a magnetic disk and a coil disk that are relatively movable and arranged to space from each other, the magnetic disk and the coil disk being respectively provided with at least one power-driven module and at least one power generation module, of which one power-driven module is arranged at an outermost diameter of the magnetic disk and the coil disk and one power generation module is arranged at an innermost diameter of the magnetic disk and the coil disk, the magnetic disk and the coil disk being respectively defined as a rotor or a stator to generate relative motion;

the at least one power-driven module being formed of a power-driven magnet array set arranged on the magnetic disk and a power-driven coil array set arranged on the coil disk and opposite to the power-driven magnet array set and an induction switch set;

wherein the power-driven magnet array set of the magnetic disk comprises at least one first magnetic member and at least one second magnetic member arranged in a moving direction, the at least one first and second magnetic members having a same length, the at least one first and second magnetic members being magnetized in the moving direction, adjacent first and second magnetic members having poles arranged to have similar polarities adjacent to each other, adjacent first and second magnetic members or second and first magnetic members having a constant-width magnetic gap therebetween;

the power-driven coil array set of the coil disk comprising at least an induction coil member having a same axis and mutually spaced, the induction coil member each having a magnetic permeable member and a coil wound around the magnetic permeable member, the coil of the induction coil member being each connected with a power source for forward supply of electricity or reversed supply of electricity, a length of the coil of the induction coil member being greater than or equal to one fourth of a length of any one magnetic member of the power-driven magnet array set and smaller than or equal to three fourths of the length of any one magnetic member of the power-driven magnet array set, a length of the magnetic permeable member of the induction coil member being greater than or equal to a length of any one magnetic member of the power-driven magnet array set plus a width of an adjacent magnetic gap and smaller than or equal to the length of any one magnetic member of the power-driven magnet array set plus the width of the adjacent magnetic gap plus a length of the coil of the same set;

the said induction switch set comprising at least one power supplying detector and at least one power cutting detector arranged on the power-driven magnet array set and at least one conducting sensor and at least one cut-off sensor arranged on the power-driven coil array set, in which the at least one power supplying detector is respectively set at a magnetic pole end face of the at least one first or second magnetic member that enters the induction coil member in the moving direction and the at least one power cutting detector is respectively set at a magnetic pole end face of the at least one first or second magnetic member that leaves the induction coil member in the moving direction, the at least one conducting sensor being respectively set at an end of the coil of the induction coil member that leaves the power-driven magnet array set in a counter moving direction, the at least one cut-off sensor being respectively set at an end of the coil of the induction coil member that enters the power-driven magnet array set in the counter moving direction;

the at least one power generation module being formed of a power generation magnet set arranged on the magnetic disk and a corresponding power generation coil set arranged on the coil disk;

wherein the power generation magnet set comprises at least one third magnetic member and at least one fourth magnetic member arranged on the magnetic disk in a moving direction, the at least one third and fourth magnetic members being magnetized perpendicular to the moving direction, the at least one third and fourth magnetic members being arranged with opposite polarities adjacent to each other, the at least one third or fourth magnetic member being corresponding to the magnetic gap of the at least one first and second magnetic members of an adjacent power-driven magnet array set, the at least one third or fourth magnetic member of the power generation magnet set and the at least one first or second magnetic member or the second or first magnetic member adjacent thereto being arranged with similar polarities adjacent to each other;

the power generation coil set comprising at least one power generation coil arranged on the coil disk in the moving direction for connection with a load, the at least one power generation coil being extended perpendicular to the moving direction, the at least one power generation coil corresponding to the at least one third or fourth magnetic member of the power generation magnet set.

In the aforesaid coaxial electromagnetic apparatus, the length of the coil of the induction coil member of the power-driven coil array set is equal to two fourths of the length of any one magnetic member of the power-driven magnet array set, and the length of the magnetic permeable member is a length of any one magnetic member of the power-driven magnet array set plus the width of the adjacent magnetic gap.

In the aforesaid coaxial electromagnetic apparatus, a position of the induction coil member of the power-driven coil array set of the coil disk is arranged to correspond to the same position of the adjacent magnetic member of the power-driven magnet array set.

In the aforesaid coaxial electromagnetic apparatus, the induction coil member of the power-driven coil array set of the coil disk is arranged alternating in position with respect to the magnetic member of the power-driven magnet array set.

In the aforesaid coaxial electromagnetic apparatus, the magnetic disk serves as the rotor and the coil disk serves as the stator, a center of the magnetic disk being provided with an axle, a center of the coil disk being formed with an axle hole for the axle to extend therethrough and pivot thereto so that the magnetic disk is rotatable relative to the coil disk.

The present invention also provides a coaxial electromagnetic apparatus, which is characterized by being formed of at least two magnetic disks and at least two coil disks that are synchronously and relatively movable and arranged spaced from and staggered with respect to each other, the at least two magnetic disks and the at least two coil disks being respectively provided with at least one power-driven module and at least one power generation module, of which one power-driven module is arranged at an outermost diameter of the magnetic disk and the coil disk and one power generation module is arranged at an innermost diameter of the magnetic disk and the coil disk, the at least two magnetic disks and the at least two coil disks be respectively defined as a rotor or a stator to synchronously and mutually generate relative motion;

the at least one power-driven module being formed of a power-driven magnet array set arranged on the magnetic disk and a power-driven coil array set arranged on the coil disk and opposite to the power-driven magnet array set and an induction switch set;

wherein the power-driven magnet array set of the magnetic disk comprises at least one first magnetic member and at least one second magnetic member arranged in a moving direction, the at least one first and second magnetic members having a same length, the at least one first and second magnetic members being magnetized in the moving direction, adjacent first and second magnetic members having poles arranged to have similar polarities adjacent to each other, adjacent first and second magnetic members or second and first magnetic members having a constant-width magnetic gap therebetween;

the power-driven coil array set of the coil disk comprising at least an induction coil member having a same axis and mutually spaced, the induction coil member each having a magnetic permeable member and a coil wound around the magnetic permeable member, the coil of the induction coil member being each connected with a power source for forward supply of electricity or reversed supply of electricity, a length of the coil of the induction coil member being greater than or equal to one fourth of a length of any one magnetic member of the power-driven magnet array set and smaller than or equal to three fourths of the length of any one magnetic member of the power-driven magnet array set, a length of the magnetic permeable member of the induction coil member being greater than or equal to a length of any one magnetic member of the power-driven magnet array set plus a width of an adjacent magnetic gap and smaller than or equal to the length of any one magnetic member of the power-driven magnet array set plus the width of the adjacent magnetic gap plus a length of the coil of the same set;

the said induction switch set comprising at least one power supplying detector and at least one power cutting detector arranged on the power-driven magnet array set and at least one conducting sensor and at least one cut-off sensor arranged on the power-driven coil array set, in which the at least one power supplying detector is respectively set at a magnetic pole end face of the at least one first or second magnetic member that enters the induction coil member in the moving direction and the at least one power cutting detector is respectively set at a magnetic pole end face of the at least one first or second magnetic member that leaves the induction coil member in the moving direction, the at least one conducting sensor being respectively set at an end of the coil of the induction coil member that leaves the power-driven magnet array set in a counter moving direction, the at least one cut-off sensor being respectively set at an end of the coil of the induction coil member that enters the power-driven magnet array set in the counter moving direction;

the at least one power generation module being formed of a power generation magnet set arranged on the magnetic disk and a corresponding power generation coil set arranged on the coil disk;

wherein the power generation magnet set comprises at least one third magnetic member and at least one fourth magnetic member arranged on the magnetic disk in a moving direction, the at least one third and fourth magnetic members being magnetized perpendicular to the moving direction, the at least one third and fourth magnetic members being arranged with opposite polarities adjacent to each other, the at least one third or fourth magnetic member being corresponding to the magnetic gap of the at least one first and second magnetic members of an adjacent power-driven magnet array set, the at least one third or fourth magnetic member of the power generation magnet set and the at least one first or second magnetic member or the second or first magnetic member adjacent thereto being arranged with similar polarities adjacent to each other;

the power generation coil set comprising at least one power generation coil arranged on the coil disk in the moving direction for connection with a load, the at least one power generation coil being extended perpendicular to the moving direction, the at least one power generation coil corresponding to the at least one third or fourth magnetic member of the power generation magnet set.

In the aforesaid coaxial electromagnetic apparatus, the length of the coil of the induction coil member of the power-driven coil array set is equal to two fourths of the length of any one magnetic member of the power-driven magnet array set, and the length of the magnetic permeable member is a length of any one magnetic member of the power-driven magnet array set plus the width of the adjacent magnetic gap.

In the aforesaid coaxial electromagnetic apparatus, a position of the induction coil member of the power-driven coil array set of the at least two coil disks are arranged to correspond to the same position of the adjacent magnetic member of the power-driven magnet array set.

In the aforesaid coaxial electromagnetic apparatus, the induction coil member of the power-driven coil array set of the at least two coil disks is arranged alternating in position with respect to the magnetic member of the power-driven magnet array set.

In the aforesaid coaxial electromagnetic apparatus, the at least two magnetic disks serve as the rotor and the at least two coil disks serve as the stator, a center of each of the magnetic disks being provided with an axle, a center of each of the coil disks being formed with an axle hole for the axle to extend therethrough and pivot thereto so that the at least two magnetic disks are synchronously rotatable relative to the at least two coil disks.

As such, due to torque amplification and good management of magnetic flow of the power-driven module, the rotational speed of the magnetic disk can be increased to achieve the purpose of reduced electrical power consumption and large thrust of the power-driven module, and also to make the power generation module generate high frequency of cutting to increase the amount of electricity generated to meet the need for power supplying of the power-driven module so as to achieve autonomous power generation and self-propelled motor.

To allow Examiner to better understand the structure, the features, and other objectives of the present invention, the following provides a detailed description of a preferred embodiment of the present invention, in combination with the drawings, so as to allow persons familiar with the technical field to reduce into practice.

DETAILED DESCRIPTION OF THE PREFERRED EMBODIMENTS

Figure 1:
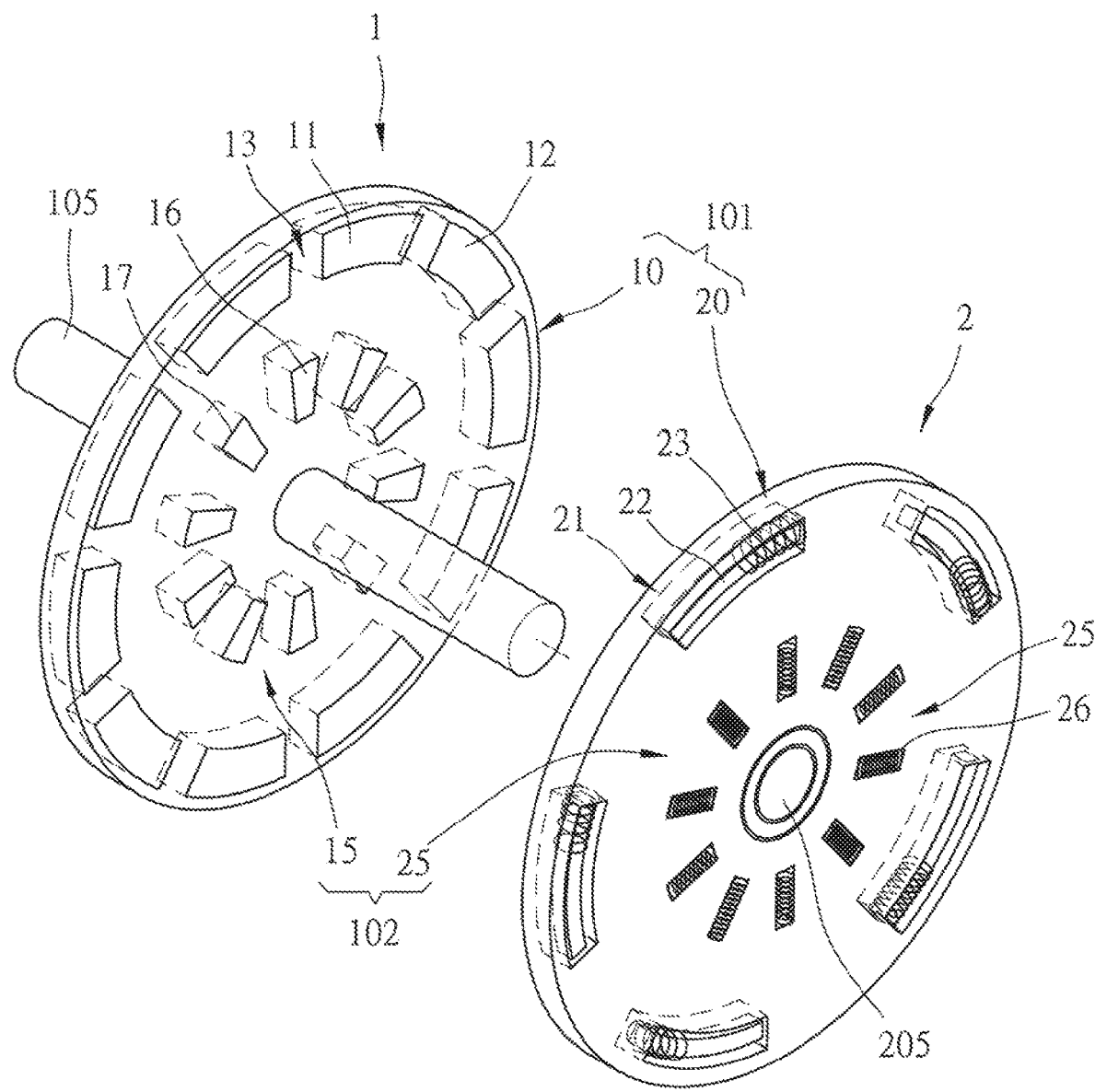
FIG. 1 is a perspective view of a preferred embodiment of a coaxial electromagnetic apparatus according to the present invention.

The present invention is a coaxial electromagnetic apparatus, and in an embodiment of the present invention that is illustrated the accompanying drawings and the parts thereof, all the references made to front and rear, left and right, top and bottom, upper and lower, and horizontal and vertical are used only for the purposes of description and are not intended to impose limitations to the present invention, and are also not intended to limit any parts at any location or in any spatial direction. The dimensions designated in the drawings and the specification may be varied, as not departing from the scope defined by the claims of the present invention, according to the design and requirements of the embodiment of the present invention.

A structure of a coaxial electromagnetic apparatus according to the present is shown in FIG. 1, which is formed by arranging at least one magnetic disk 1 and at least one coil disk 2, which are movable relative to each other, in a spaced and alternating manner, and the magnetic disk 1 and the coil disk 2 are respectively provided thereon with at least one power-driven module 101 and at least one power generation module 102, wherein one power-driven module 101 is arranged at an outermost diameter of the magnetic disk 1 and the coil disk 2 and wherein one power generation module 102 is arranged at an innermost diameter of the magnetic disk 1 and the coil disk 2, and further, the at least two magnetic disks 1 and the at least two coil disks 2 are respectively defined as a "rotor" or a "stator", for synchronously and mutually generating relative motion. In a preferred embodiment of the present invention, the at least two magnetic disks 1 are used to function as the rotor, and the at least two coil disks 2 are used to function as the stator.

Figure 2:
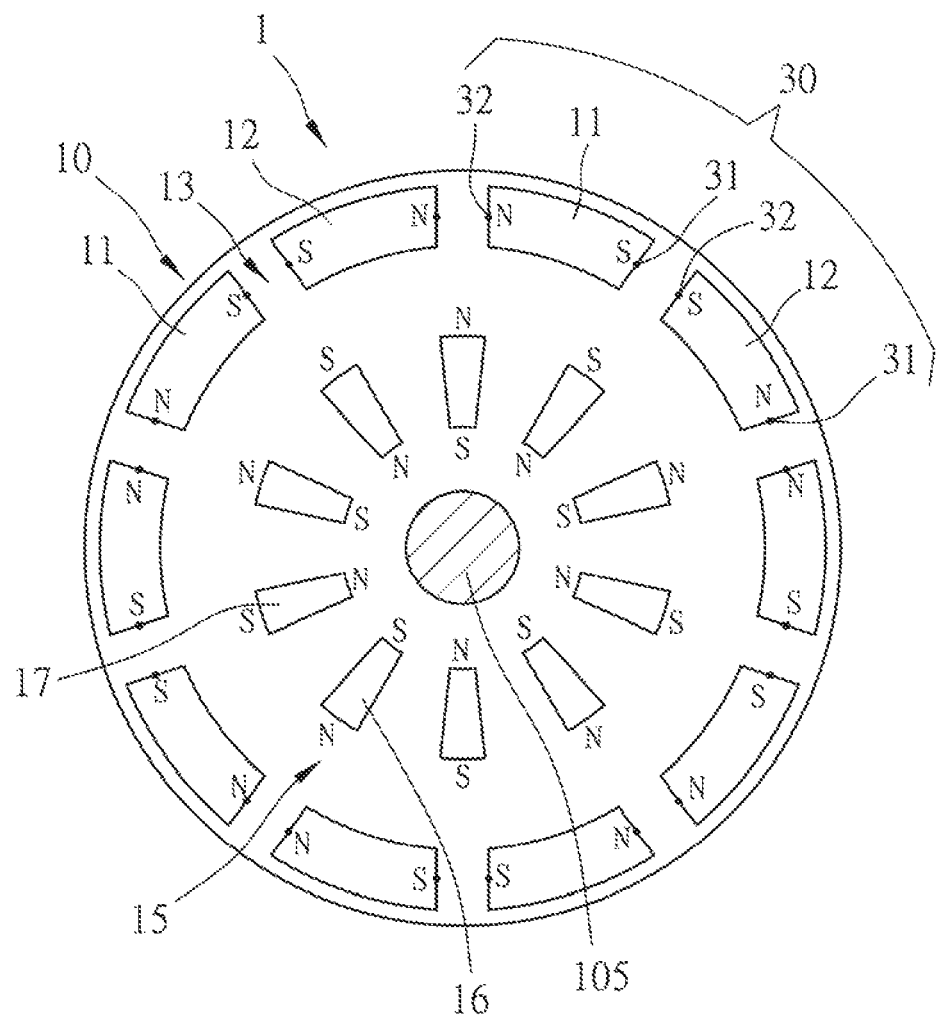
FIG. 2 is a schematic view showing a plan layout of a magnetic disc of the preferred embodiment of the coaxial electromagnetic apparatus according to the present invention.
Figure 3:
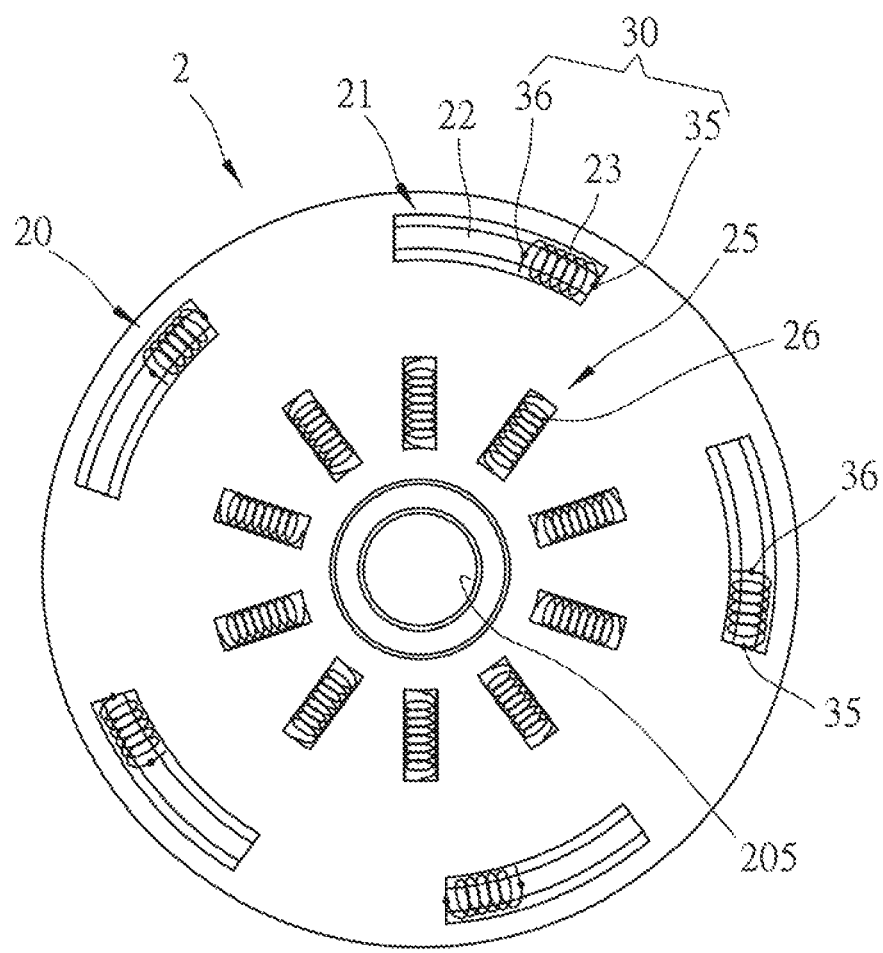
FIG. 3 is a schematic view showing a plan layout of a coil disc of the preferred embodiment of the coaxial electromagnetic apparatus according to the present invention.

As to a detailed structure of the preferred embodiment of the present invention, reference is made to the illustrations of FIGS. 1, 2, and 3. The at least one power-driven module 101 is formed of a power-driven magnet array set 10 that is arranged on the magnetic disk 1 and an opposite power-driven coil array set 20 arranged on the coil disk 2 and an induction switch set 30.

And, these said power-driven magnet array sets 10 are such that, as shown in FIGS. 1 and 2, the magnetic disk 1 is provided with at least one first magnetic member 11 and at least one second magnetic member 12 that are arranged to space from each other in a moving direction. Further, the at least one first or second magnetic member 11, 12 has a same length, and the at least one first or second magnetic members 11, 12 is magnetized in the moving direction, while adjacent first and second magnetic members 11, 12 or second and first magnetic members 12, 11 are arranged such that the same polarities are adjacent to each other, such as N pole corresponding to N pole or S pole corresponding to S pole (as shown in FIG. 2), and the adjacent first and second magnetic members 11, 12 or second and first magnetic members 12, 11 include a magnetic gap 13 of the same width therebetween, and further, each magnetic disk 1 is provided, in a center thereof, with an axle 105 for synchronous rotation.

And, these said power-driven coil array sets 20 are such that, as shown in FIGS. 1 and 3, the coil disk 2 is provided with at least one induction coil member 21 that has a same axis and is spaced from each other. The induction coil member 21 comprises a magnetic permeable member 22 and a coil 23 wound around the magnetic permeable member 22. The coil 23 is connected to a power source, wherein the power source may supply electricity in a forward direction or may supply electricity in a reversed direction so that when the coil 23 of the induction coil member 21 is magnetized when connected with the power source to allow the power-driven coil array set 20 to generate, with respect to the power-driven magnet array set 10, a magnetic force that drives a relative motion between the two. Further, a length of the coil 23 of the induction coil member 21 is greater than or equal to one fourth of a length of the magnetic member 11, 12, and the length of the coil 23 is smaller than or equal to three fourths of the length of the magnetic member 11, 12, and a preferred length of the coil 23 according to the present invention is equal to two fourths of the length of the magnetic member 11, 12. Further, a length of the magnetic permeable member 22 of the induction coil member 21 is greater than or equal to the length of any one magnetic member 11, 12 plus a width of an adjacent magnetic gap 13, and the length of the magnetic permeable member 22 is smaller than or equal to the length of any one magnetic member 11, 12 plus the width of the adjacent magnetic gap 13 further plus the length of the coil 23 of the same set, and a preferred length of the magnetic permeable member 22 is the length of any one magnetic member 11, 12 plus the width of the adjacent magnetic gap 13, and further, a center of each coil disk 2 is formed with an axle hole 205 for the axle 105 to extend therethrough and pivot thereto so that the magnetic disk 1 is rotatable relative to the coil disk 2.

Figure 4:
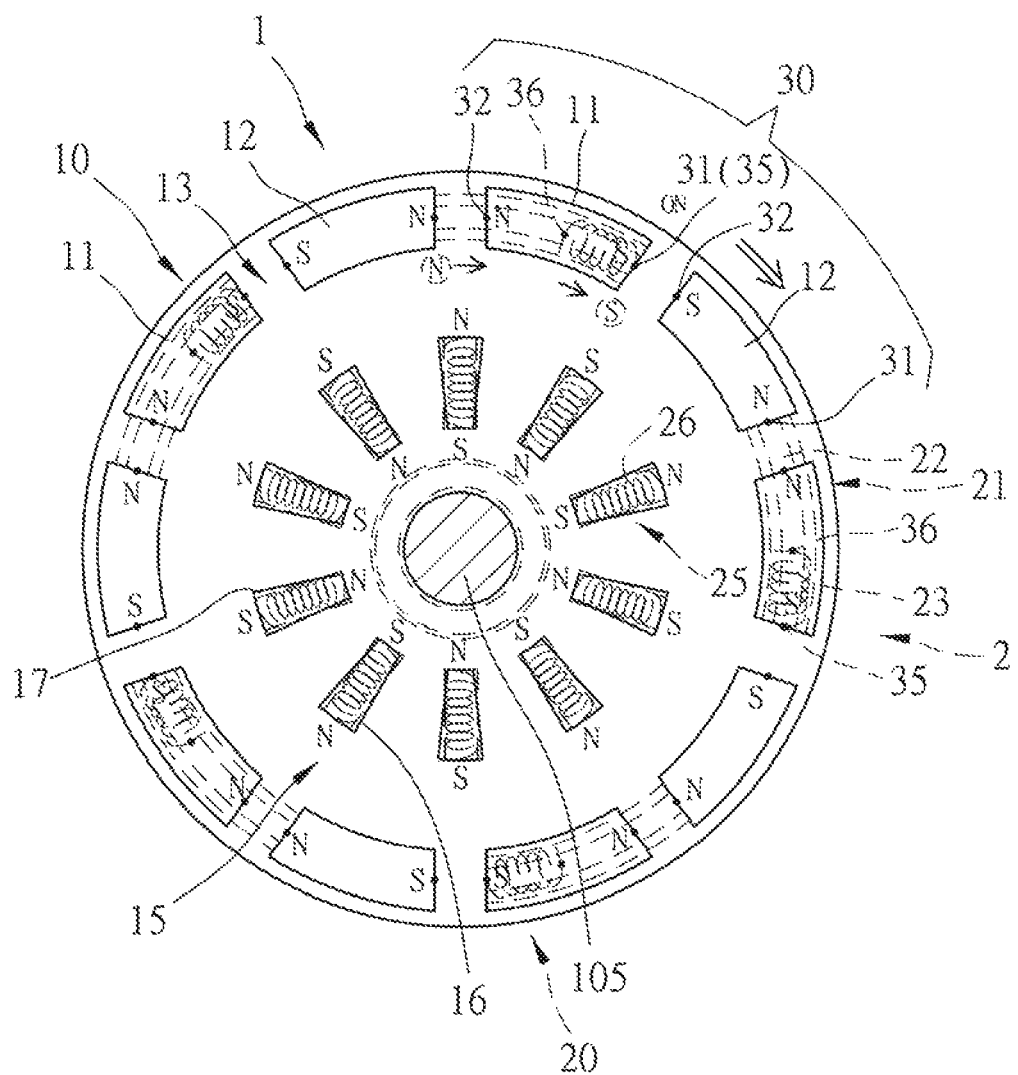
FIG. 4 is a schematic view showing an operation of the preferred embodiment of the coaxial electromagnetic apparatus according to the present invention, illustrating a condition of power being supplied.
Figure 5:
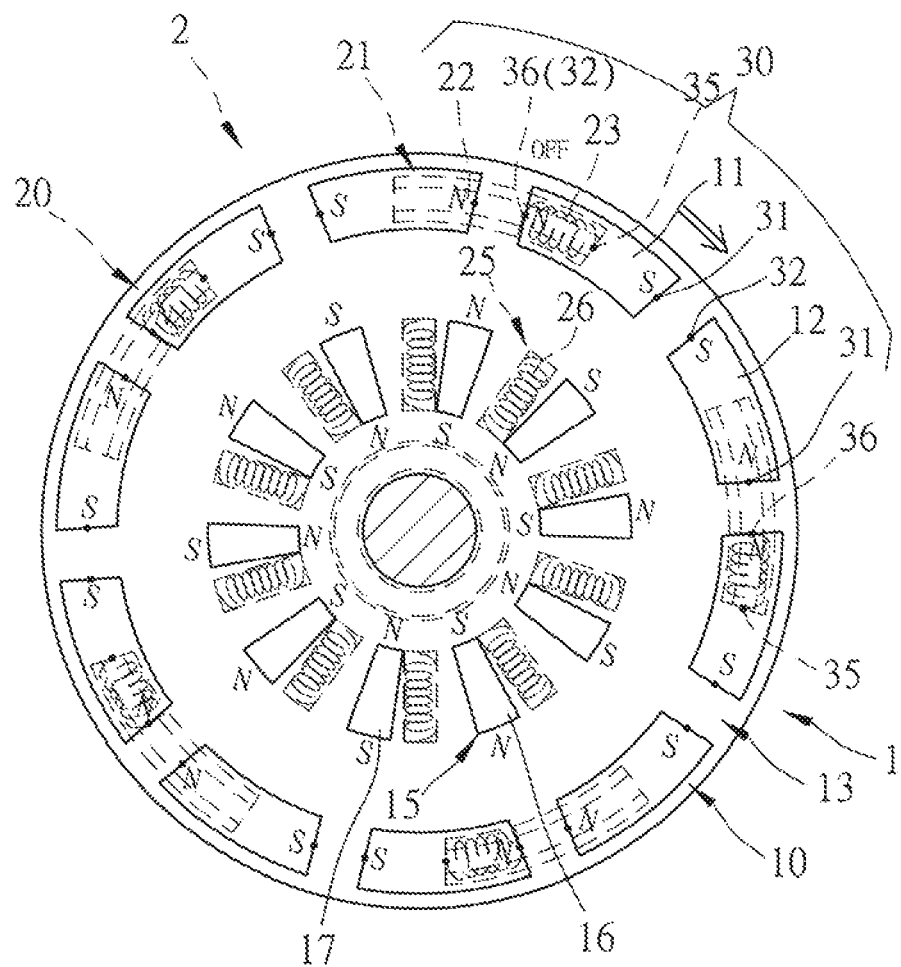
FIG. 5 is another schematic view showing an operation of the preferred embodiment of the coaxial electromagnetic apparatus according to the present invention, illustrating a condition of power being not supplied.

Referring to FIGS. 2 and 3, the said induction switch set 30 comprises at least one power supplying detector 31 and at least one power cutting detector 32 arranged on the power-driven magnet array set 10 of the magnetic disk 1 and at least one conducting sensor 35 and at least one cut-off sensor 36 arranged on the power-driven coil array set 20 of the coil disk 2 for controlling the coil 23 of the power-driven coil army set 20 connected to the power source or not. In this arrangement, the at least one power supplying detector 31 is each arranged on a magnetic pole end face of the at least one first or second magnetic member 11, 12 that enters the induction coil member 21 according to the moving direction and the at least one power cutting detector 32 is each arranged on a magnetic pole end fact of the at least one first or second magnetic member 11, 12 that leaves the induction coil member 21 according to the moving direction, and further, the at least one conducting sensor 35 is each arranged on an end of the coil 23 of the induction coil member 21 that leaves said these power-driven magnet array sets 10 opposite to the moving direction, and the at least one cut-off sensor 36 is each arranged on an end of the coil 23 of the induction coil member 21 that enters these said power-driven magnet array sets 10 opposite to the moving direction, for allowing the power source and the coil 23 of the corresponding induction coil member 21 to connect and supply electricity when the conducting sensor 35 on the induction coil member 21 detects the power supplying detector 31 of the first or second magnetic member 11, 12, thereby generating magnetization and causes an effect of magnetism as shown in FIG. 4, and for allowing the coil 23 of the corresponding induction coil member 21 to not connect with the power source when the at least one cut-off sensor 36 detects the power cutting detector 32 of the first or second magnetic member 11, 12, thereby forming a condition of not supplying electricity as shown in FIG. 5, the power source being connected and supplying electricity is when the coil 23 of the induction coil member 21 is at a location corresponding to the first or second magnetic member 11, 12, making it possible to reduce an induced internal voltage, so as to effectively reduce an input electrical power.

The at least one power generation module 102 is formed of a power generation magnet set 15 arranged on the magnetic disk 1 and a corresponding power generation coil set 25 arranged on the coil disk 2.

In such an arrangement, these said power generation magnet sets 15 are such that the magnetic disk 1 is provided with at least one third magnetic member 16 and at least one fourth magnetic member 17 that are arranged to space from each other in a moving direction, and the at least one third and fourth magnetic members 16, 17 is magnetized vertical to the moving direction, and the at least one third and fourth magnetic members 16, 17 is arranged in a manner of opposite polarities being adjacent to each other, and the at least one third or fourth magnetic member 16, 17 is arranged to correspond to the magnetic gap 13 of the at least one first or second magnetic member 11, 12 of an adjacent power-driven magnet array set 10, and the at least one third or fourth magnetic member 16, 17 of the power generation magnet set 15 and the at least one first or second magnetic member 11, 12 or the second or first magnetic members 12, 11 adjacent thereto are arranged in a manner of having the magnetic poles of the same polarity adjacent to each other to form a direction consistent magnetic path, avoiding magnetic collapse and maintaining excellent magnetic flow management, allowing increase of magnitude of magnetic assistance force and number of cutting of power generation, such as N pole corresponding to N pole or S pole corresponding to S pole (as shown in FIG. 2).

Further, these said power generation coil sets 25 are such that the coil disk 2 is provided with at least one power generation coil 26 arranged in the moving direction, for connection with the load, and these said power generation coils 26 are extended vertical to the moving direction, and further, these said power generation coils 26 correspond to the at least one third or fourth magnetic members 16, 17 of the power generation magnet set 15, for allowing an effect of power generation when the at least one third or fourth magnetic member 16, 17 of the power generation magnet set 15 and the power generation coil 26 of the power generation coil set 25 undergo cutting of magnetic force lines, for supplying to the load or storage.

As such, a coaxial electromagnetic apparatus featuring autonomous power generation and self-propelled motor is formed.

As to an actual operation of the preferred embodiment of the coaxial electromagnetic apparatus according to the present invention is shown in FIGS. 4 and 5. When the power-driven magnet array sets 10 of at least two magnetic disks 1 and the power-driven coil array sets 20 of at least two coil disks 2 synchronously generate a relative motion, such that in this invention, the magnetic disk 1 functions as a rotor that rotates and the coil disk 2 functions as a stator that is immobile.

As shown in FIG. 4, the induction switch set 30 is such that when the power supplying detector 31 at an end of the first magnetic member 11 or the second magnetic member 12 of the power-driven magnet array set 10 that is the same as the moving direction detects the conducting sensor 35 at a leaving end of the coil 23 of the power-driven coil array set 20 that is opposite to the moving direction, the coil 23 of the power-driven coil array set 20 is supplied with electricity in the forward direction or the reversed direction, making the magnetic permeable member 22 of the induction coil member 21 generate polarity due to magnetization of the coil 23, and when the first magnetic member 11 corresponds to the coil 23 with S pole thereof, the magnetic permeable member 22 of the induction coil member 21 shows N pole at an entering end in the moving direction, while showing S pole in a leaving end. And, when the second magnetic member 12 corresponds to the coil 23 with N pole thereof, the magnetic permeable member 22 of the induction coil member 21 shows S pole at an entering end in the moving direction, while showing N pole in a leaving end. Further, at this moment, the position of the entering end of the magnetic permeable member 22 of the induction coil member 21 opposite to the moving direction is located at a next adjacent second magnetic member 12 or the first magnetic member 11, so that the polarity of the leaving end of the induction coil member 21 of the power-driven coil array set 20 opposite to the moving direction and the magnetic pole of the detected first magnetic member 11 or second magnetic member 12 exhibit a condition of similar polarities expelling each other and a thrust is induced opposite to the moving direction, and at the same time, the polarity of the entering end of the magnetic permeable member 22 of the induction coil member 21 of the power-driven coil array set 20 opposite to the moving direction and the next adjacent second or first magnetic member 12, 11 to the detected first or second magnetic member 11, 12 also exhibit a condition of similar polarities expelling each other so as to generate another thrust opposite to the moving direction, thereby making the power-driven coil array set 20 and the power-driven magnet array set 10 generating a magnetic assistance force of completely thrust opposite to the moving direction to effectively increase a rotational speed of the magnetic disk 1 and thus increase output power.

Oppositely, as shown in FIG. 5, the power-driven magnet array set 10 and the power-driven coil array set 20 continue the relative motion, and the induction switch set 30 is such that when the power cutting detector 32 at an end of the first or second magnetic member 11, 12 of the power-driven magnet array set 10 that is originally supplied with electricity opposite to the moving direction detects the cut-off sensor 36 at the entering end of the coil 23 of the induction coil member 21 of the power-driven coil array set 20, the coil 23 of the power-driven coil array set 20 cuts off the power source to make the induction coil member 21 of the power-driven coil army set 20 not to generate an effecting magnetic field, avoiding the necessity of inputting a large electrical power to magnetize the coil 23 to generate a corresponding polarity due to the coil 23 of the induction coil member 21 entering a power generation zone of the magnetic gap.

Further, since the magnetic pole axis of the at least one first or second magnetic member 11, 12 of the power-driven magnet array set 10 is parallel to the moving direction, it is possible to effectively reduce internal voltage when the coil 23 of the induction coil member 21 of the power-driven coil array set 20 is in a non power generation zone, thereby reducing the input electrical power when the coil 23 of the induction coil member 21 is supplied with power and driven, and at the same time, with the enhanced magnetic assistance force of the fixed direction magnetic flow, the operation speed of the magnetic disk 1 can be increased to achieve the purpose of small consumption of electricity and large amount of thrust.

Further, since the power-driven module 101 is arranged at the outermost diameter of the magnetic disk 1 and the coil disk 2, and the power generation module 102 is arranged at the innermost diameter of the magnetic disk 1 and the coil disk 2, as being affected by amplification of torque and fixed direction of magnetic flow of the power-driven module 101, it is possible to have the power generation magnet set 15 and the power generation coil set 25 of the power generation module 102 generating high cutting frequency under operation of increased speed of the magnetic disk 1 to meet the need for power supplying for the power-driven module 101 so as to achieve the purpose of autonomous power generation and self-propelled motor.

Figure 6:
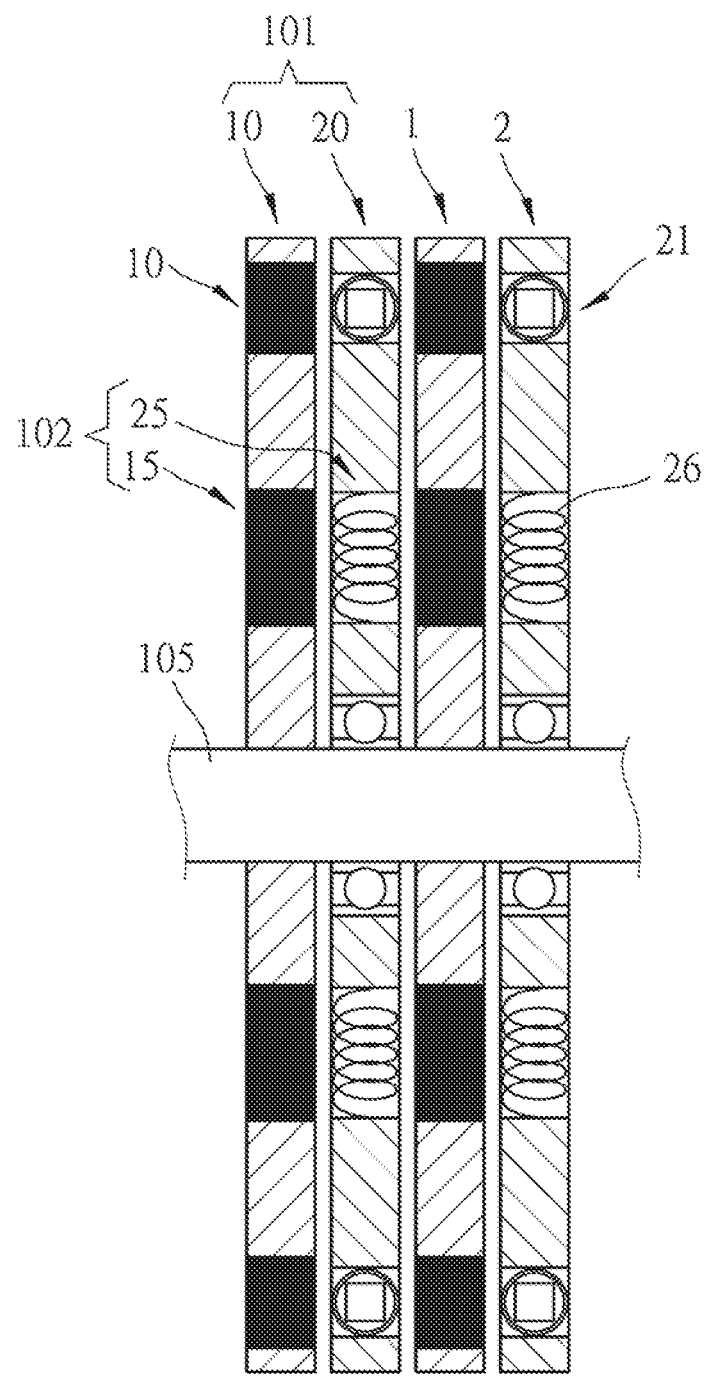
FIG. 6 is a side elevational view of another preferred embodiment of the coaxial electromagnetic apparatus according to the present invention, illustrating a condition of arrayed arrangement of discs.

Further, in another preferred embodiment of the present invention, as shown in FIG. 6, the embodiment exhibits disk-fashion arrayed coaxial electromagnetic apparatus, which is formed by arranging at least two the magnetic disks 1 and at least two coil disks 2 in a spaced and staggered manner with similar polarities facing each other, so as to effectively enhance the overall output of kinetic energy and electrical power.

As such, it can be appreciated that the present invention is a practical invention showing excellent creativity, which in addition to effectively resolving the problems that the prior art faces, can greatly improve effectiveness, and it is noticed that, in the same field of technology, no invention of identical or similar products has been proposed or being publicly used while showing the same improvement of effectiveness. Thus, this invention is in complete compliance with requirements concerning novelty and inventiveness stipulated for a patent and an application for patent is thus filed accordingly.

We claim:

1. A coaxial electromagnetic apparatus, characterized by being formed of a magnetic disk and a coil disk that are relatively movable and arranged to space from each other, the magnetic disk and the coil disk being respectively provided with at least one power-driven module and at least one power generation module, of which one power-driven module is arranged at an outermost diameter of the magnetic disk and the coil disk and one power generation module is arranged at an innermost diameter of the magnetic disk and the coil disk, the magnetic disk and the coil disk being respectively defined as a rotor or a stator to generate relative motion;

the at least one power-driven module being formed of a power-driven magnet array set arranged on the magnetic disk and a power-driven coil array set arranged on the coil disk and opposite to the power-driven magnet array set and an induction switch set;

wherein the power-driven magnet array set of the magnetic disk comprises at least one first magnetic member and at least one second magnetic member arranged in a moving direction, the at least one first and second magnetic members having a same length, the at least one first and second magnetic members being magnetized in the moving direction, adjacent first and second magnetic members having poles arranged to have similar polarities adjacent to each other, adjacent first and second magnetic members or second and first magnetic members having a constant-width magnetic gap therebetween;

the power-driven coil array set of the coil disk comprising at least an induction coil member having a same axis and mutually spaced, the induction coil member each having a magnetic permeable member and a coil wound around the magnetic permeable member, the coil of the induction coil member being each connected with a power source for forward supply of electricity or reversed supply of electricity, a length of the coil of the induction coil member being greater than or equal to one fourth of a length of any one magnetic member of the power-driven magnet array set and smaller than or equal to three fourths of the length of any one magnetic member of the power-driven magnet array set, a length of the magnetic permeable member of the induction coil member being greater than or equal to a length of any one magnetic member of the power-driven magnet array set plus a width of an adjacent magnetic gap and smaller than or equal to the length of any one magnetic member of the power-driven magnet array set plus the width of the adjacent magnetic gap plus a length of the coil of the same set;

the said induction switch set comprising at least one power supplying detector and at least one power cutting detector arranged on the power-driven magnet array set and at least one conducting sensor and at least one cut-off sensor arranged on the power-driven coil array set, in which the at least one power supplying detector is respectively set at a magnetic pole end face of the at least one first or second magnetic member that enters the induction coil member in the moving direction and the at least one power cutting detector is respectively set at a magnetic pole end face of the at least one first or second magnetic member that leaves the induction coil member in the moving direction, the at least one conducting sensor being respectively set at an end of the coil of the induction coil member that leaves the power-driven magnet array set in a counter moving direction, the at least one cut-off sensor being respectively set at an end of the coil of the induction coil member that enters the power-driven magnet array set in the counter moving direction;

the at least one power generation module being formed of a power generation magnet set arranged on the magnetic disk and a corresponding power generation coil set arranged on the coil disk;

wherein the power generation magnet set comprises at least one third magnetic member and at least one fourth magnetic member arranged on the magnetic disk in a moving direction, the at least one third and fourth magnetic members being magnetized perpendicular to the moving direction, the at least one third and fourth magnetic members being arranged with opposite polarities adjacent to each other, the at least one third or fourth magnetic member being corresponding to the magnetic gap of the at least one first and second magnetic members of an adjacent power-driven magnet array set, the at least one third or fourth magnetic member of the power generation magnet set and the at least one first or second magnetic member or the second or first magnetic member adjacent thereto being arranged with similar polarities adjacent to each other;

the power generation coil set comprising at least one power generation coil arranged on the coil disk in the moving direction for connection with a load, the at least one power generation coil being extended perpendicular to the moving direction, the at least one power generation coil corresponding to the at least one third or fourth magnetic member of the power generation magnet set.

2. The coaxial electromagnetic apparatus according to claim 1, characterized in that the length of the coil of the induction coil member of the power-driven coil array set is equal to two fourths of the length of any one magnetic member of the power-driven magnet array set, and the length of the magnetic permeable member is a length of any one magnetic member of the power-driven magnet array set plus the width of the adjacent magnetic gap.

3. The coaxial electromagnetic apparatus according to claim 1, characterized in that a position of the induction coil member of the power-driven coil array set of the coil disk is arranged to correspond to the same position of the adjacent magnetic member of the power-driven magnet array set.

4. The coaxial electromagnetic apparatus according to claim 1, characterized in that the induction coil member of the power-driven coil array set of the coil disk is arranged alternating in position with respect to the magnetic member of the power-driven magnet array set.

5. The coaxial electromagnetic apparatus according to claim 1, characterized in that the magnetic disk serves as the rotor and the coil disk serves as the stator, a center of the magnetic disk being provided with an axle, a center of the coil disk being formed with an axle hole for the axle to extend therethrough and pivot thereto so that the magnetic disk is rotatable relative to the coil disk.

6. The coaxial electromagnetic apparatus according to claim 2, characterized in that a position of the induction coil member of the power-driven coil array set of the at least two coil disks is arranged to correspond to the same position of the adjacent magnetic member of the power-driven magnet array set.

7. The coaxial electromagnetic apparatus according to claim 3, characterized in that the induction coil member of the power-driven coil array set of the at least two coil disks is arranged alternating in position with respect to the magnetic member of the power-driven magnet array set.

8. The coaxial electromagnetic apparatus according to claim 4, characterized in that the at least two magnetic disks serve as the rotor and the at least two coil disks serve as the stator, a center of each of the magnetic disks being provided with an axle, a center of each of the coil disks being formed with an axle hole for the axle to extend therethrough and pivot thereto so that the at least two magnetic disks are synchronously rotatable relative to the at least two coil disks.

9. A coaxial electromagnetic apparatus, characterized by being formed of at least two magnetic disks and at least two coil disks that are synchronously and relatively movable and arranged spaced from and staggered with respect to each other, the at least two magnetic disks and the at least two coil disks being respectively provided with at least one power-driven module and at least one power generation module, of which one power-driven module is arranged at an outermost diameter of the magnetic disk and the coil disk and one power generation module is arranged at an innermost diameter of the magnetic disk and the coil disk, the at least two magnetic disks and the at least two coil disks be respectively defined as a rotor or a stator to synchronously and mutually generate relative motion;

the at least one power-driven module being formed of a power-driven magnet array set arranged on the magnetic disk and a power-driven coil array set arranged on the coil disk and opposite to the power-driven magnet array set and an induction switch set;

wherein the power-driven magnet array set of the magnetic disk comprises at least one first magnetic member and at least one second magnetic member arranged in a moving direction, the at least one first and second magnetic members having a same length, the at least one first and second magnetic members being magnetized in the moving direction, adjacent first and second magnetic members having poles arranged to have similar polarities adjacent to each other, adjacent first and second magnetic members or second and first magnetic members having a constant-width magnetic gap therebetween;

the power-driven coil array set of the coil disk comprising at least an induction coil member having a same axis and mutually spaced, the induction coil member each having a magnetic permeable member and a coil wound around the magnetic permeable member, the coil of the induction coil member being each connected with a power source for forward supply of electricity or reversed supply of electricity, a length of the coil of the induction coil member being greater than or equal to one fourth of a length of any one magnetic member of the power-driven magnet array set and smaller than or equal to three fourths of the length of any one magnetic member of the power-driven magnet array set, a length of the magnetic permeable member of the induction coil member being greater than or equal to a length of any one magnetic member of the power-driven magnet array set plus a width of an adjacent magnetic gap and smaller than or equal to the length of any one magnetic member of the power-driven magnet array set plus the width of the adjacent magnetic gap plus a length of the coil of the same set;

the said induction switch set comprising at least one power supplying detector and at least one power cutting detector arranged on the power-driven magnet array set and at least one conducting sensor and at least one cut-off sensor arranged on the power-driven coil array set, in which the at least one power supplying detector is respectively set at a magnetic pole end face of the at least one first or second magnetic member that enters the induction coil member in the moving direction and the at least one power cutting detector is respectively set at a magnetic pole end face of the at least one first or second magnetic member that leaves the induction coil member in the moving direction, the at least one conducting sensor being respectively set at an end of the coil of the induction coil member that leaves the power-driven magnet array set in a counter moving direction, the at least one cut-off sensor being respectively set at an end of the coil of the induction coil member that enters the power-driven magnet array set in the counter moving direction;

the at least one power generation module being formed of a power generation magnet set arranged on the magnetic disk and a corresponding power generation coil set arranged on the coil disk;

wherein the power generation magnet set comprises at least one third magnetic member and at least one fourth magnetic member arranged on the magnetic disk in a moving direction, the at least one third and fourth magnetic members being magnetized perpendicular to the moving direction, the at least one third and fourth magnetic members being arranged with opposite polarities adjacent to each other, the at least one third or fourth magnetic member being corresponding to the magnetic gap of the at least one first and second magnetic members of an adjacent power-driven magnet array set, the at least one third or fourth magnetic member of the power generation magnet set and the at least one first or second magnetic member or the second or first magnetic member adjacent thereto being arranged with similar polarities adjacent to each other;

the power generation coil set comprising at least one power generation coil arranged on the coil disk in the moving direction for connection with a load, the at least one power generation coil being extended perpendicular to the moving direction, the at least one power generation coil corresponding to the at least one third or fourth magnetic member of the power generation magnet set.

10. The coaxial electromagnetic apparatus according to claim 9, characterized in that the length of the coil of the induction coil member of the power-driven coil array set is equal to two fourths of the length of any one magnetic member of the power-driven magnet array set, and the length of the magnetic permeable member is a length of any one magnetic member of the power-driven magnet array set plus the width of the adjacent magnetic gap.

11. The coaxial electromagnetic apparatus according to claim 9, characterized in that a position of the induction coil member of the power-driven coil array set of the at least two coil disks is arranged to correspond to the same position of the adjacent magnetic member of the power-driven magnet array set.

12. The coaxial electromagnetic apparatus according to claim 9, characterized in that the induction coil member of the power-driven coil array set of the at least two coil disks is arranged alternating in position with respect to the magnetic member of the power-driven magnet array set.

13. The coaxial electromagnetic apparatus according to claim 9 characterized in that the at least two magnetic disks serve as the rotor and the at least two coil disks serve as the stator, a center of each of the magnetic disks being provided with an axle, a center of each of the coil disks being formed with an axle hole for the axle to extend therethrough and pivot thereto so that the at least two magnetic disks are synchronously rotatable relative to the at least two coil disks.

14. The coaxial electromagnetic apparatus according to claim 10 characterized in that the at least two magnetic disks serve as the rotor and the at least two coil disks serve as the stator, a center of each of the magnetic disks being provided with an axle, a center of each of the coil disks being formed with an axle hole for the axle to extend therethrough and pivot thereto so that the at least two magnetic disks are synchronously rotatable relative to the at least two coil disks.

15. The coaxial electromagnetic apparatus according to claim 11 characterized in that the at least two magnetic disks serve as the rotor and the at least two coil disks serve as the stator, a center of each of the magnetic disks being provided with an axle, a center of each of the coil disks being formed with an axle hole for the axle to extend therethrough and pivot thereto so that the at least two magnetic disks are synchronously rotatable relative to the at least two coil disks.

16. The coaxial electromagnetic apparatus according to claim 12 characterized in that the at least two magnetic disks serve as the rotor and the at least two coil disks serve as the stator, a center of each of the magnetic disks being provided with an axle, a center of each of the coil disks being formed with an axle hole for the axle to extend therethrough and pivot thereto so that the at least two magnetic disks are synchronously rotatable relative to the at least two coil disks.

* * * * *